July 19, 1955 G. C. SZIKLAI 2,713,606

COLOR TELEVISION SYSTEMS

Filed April 18, 1952

2 Sheets-Sheet 1

INVENTOR
George C. Sziklai
BY
Olin C. Mitchell
ATTORNEY

July 19, 1955 G. C. SZIKLAI 2,713,606

COLOR TELEVISION SYSTEMS

Filed April 18, 1952

2 Sheets-Sheet 2

INVENTOR
George C. Sziklai
BY
Olin V. Mitchell
ATTORNEY

United States Patent Office 2,713,606

Patented July 19, 1955

2,713,606

COLOR TELEVISION SYSTEMS

George C. Sziklai, Princeton, N. J., assignor to Radio Corporation of America, a corporation of Delaware Application April 18, 1952, Serial No. 282,979

9 Claims. (Cl. 178—5.4)

This invention relates to color television systems and methods, and more particularly it relates to apparatus for providing reproduction of color in phase modulated color subcarrier systems.

It is desirable to provide a color television system in which the entire signal information, that is, the brightness, hue, and saturation signal components, is utilized directly and efficiently by different elements of the reproducing device to produce a color picture. Some such systems have heretofore been proposed, such as, for example, the one shown and described in my copending U. S. application, Serial No. 165,031, filed May 29, 1950, entitled Visual Indicating Systems. In the system referred to immediately above, a phase modulation component of the signal, which represents hue, is used to direct or deflect the kinescope beam to the proper color. The amplitude component of the phase modulated subcarrier is additionally utilized for changing the beam size or focus so that the desired number of color reproducing elements are bombarded by the beam. In this manner the proper combinations of colors are selected to provide the desired hue and saturation, and the brightness component is provided by intensity modulating the beam to produce directly in the kinescope a color picture from the incoming video information.

Certain registration and efficiency problems are provided in color television systems utilizing kinescopes having a plurality of electron beam guns. In the system above described, it is possible to utilize a single gun color reproducing device since all information other than the brightness component is applied to deflection and focussing electrodes in the kinescope. Therefore, cathode ray tubes may be constructed without the reject cost due to extreme accuracy and tolerance requirements in aligning and matching a plurality of beam producing guns.

Further, it is desired to utilize simple and readily constructed phosphor reproducing surfaces of electron tubes used in color television systems, and also to increase the light efficiency of the tube. Accordingly, a ruled line screen single gun cathode ray tube is preferred in accordance with the present invention.

In using colored line screens on cathode ray tubes with adjacently positioned horizontally oriented ruled colored lines having different selected component light producing elements, for example, red, green and blue, it has been a problem to accurately direct the beam to the desired color line combination. This is generally true because commercially feasible circuits for deflecting the cathode ray beam do not accurately follow a straight color line entirely across the face of the kinescope. Accordingly, elaborate registration schemes have been developed. Examples of these registration systems may be found in my U. S. Patent No. 2,587,074, issued February 26, 1952, entitled Color Television Image Reproducing System, and the U. S. Patent 2,490,812, dated December 13, 1949, issued to C. E. Huffman, entitled Control for Color Television. Further registration systems have been provided for three gun ruled line color tubes such as the copending U. S. application, Serial No. 198,213, filed by V. D. Landon, entitled Color Television Registration Systems, now Patent No. 2,621,244 issued December 9, 1952. In these registration systems referred to immediately above, circuitry has been provided for solving the registry problem.

In accordance with the present invention, however, both color reproduction and color registration are accurately provided by a single circuit comprising a feedback loop or servo system actuated by a signal derived from sampling the colors reproduced on the screen of the color tube and compared with the color subcarrier of the incoming television signal. In this manner, improved circuit efficiency is made possible with a simple and reliable reproducing tube structure, and the reproduced picture on the screen is caused to comply not only with changes in signal information but to correct for error information creeping into the system at any point.

It is therefore an object of the present invention to provide color television systems providing improved color reproduction and registration with a single beam controlled color reproduction device having line ruled color light producing elements.

It is a further object of this invention to provide an improved color television system operable with television signals including a color subcarrier component phase modulated with color hue information and amplitude modulated with color saturation information.

Another object of the invention is to provide an improved television system in which signal brightness, hue, and saturation information is utilized directly by different elements of the reproducing device to develop a color picture.

It is a still further object of the invention to provide a system operable with a single gun tube wherein the brightness signal component is used to intensity modulate the scanning beam and the hue and saturation signal components are respectively used to deflect and focus the scanning beam.

Other objects and features of advantage of the invention will be found throughout the following description of the invention and its mode of operation. The invention may be more readily understood when the description is read in connection with the accompanying drawings in which.

Figure 1:
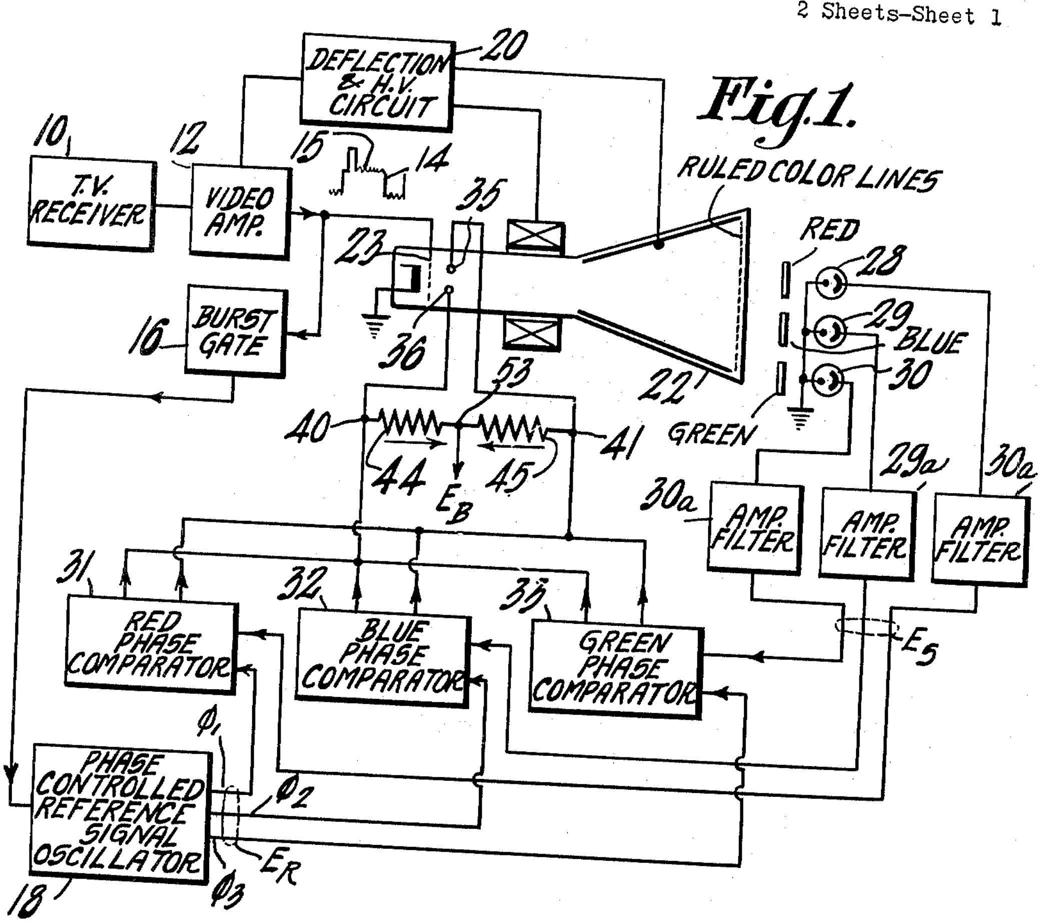
Figure 1 is a block diagram representation of a color television system embodying the invention.

Throughout the drawing, like reference characters will be used to indicate like circuit elements in order to facilitate comparison. Those circuits whose details may not of themselves be a part of the present invention are shown in block diagram form in order that the nature of the invention might more readily be ascertained.

In Figure 1 any suitable television receiver 10 is provided for detecting a video signal for use in the video amplifier 12 and having a color subcarrier component whose phase represents color hue and whose intensity represents color saturation. In this type of signal represented by the waveform 14, there is generally contained a burst of subcarrier reference frequency 15 on the back porch of the horizontal sync pedestal. The burst 15 may be separated from the video by burst gate circuits 16 to phase control a reference signal oscillator 18 thereby maintaining it in an accurate phase relationship with the subcarrier generator at the transmitter.

The usual deflection and high voltage circuits 20 are provided for causing the electron beam generated in the kinescope 22 to scan the ruled color lines which form the kinescope screen. The amplitude of the video wave represents the brightness component of the picture and is used to intensity modulate the the cathode ray beam by application to the control element 23. There is contained in the video brightness signal the subcarrier component whose phase and amplitude represent the color hue, and saturation information, respectively. Accordingly, on the kinescope screen, there will be developed a modulation component at the subcarrier frequency which may, for example, be a frequency near the upper end of the video response characteristic of the system, say 3.99 megacycles. The subcarrier is chosen to have a frequency so related to the scanning frequency that a minimum of interference occurs between the color information and the brightness information.

A plurality of separate sampling devices such as the photo-electric cells 28, 29 and 30 with the corresponding red, blue and green pass filters are used to detect the subcarrier at the reproduction level. This information is suitably amplified and filtered by apparatus 28*a*, 29*a*, and 30*a*, if necessary to comprise a signal voltage $E_s$ correspondingly inserted at one input terminal of the respective red, blue, and green phase comparator circuits 31, 32 and 33. The subcarrier phase may be detected by comparing it with a reference signal $E_r$ derived from the color subcarrier oscillator 18 in the respective phases $\phi_1$, $\phi_2$, $\phi_3$ in a manner similar to that practiced in current color subcarrier systems. By choosing the proper polarity and phase, output potentials will be obtained from the phase comparator circuits with sense and amplitude such as to provide deflection anrd focus potentials to the kinescope beam by means of the auxiliary deflecting and focusing electrodes 35 and 36. These electrodes may be constructed by those skilled in the art to have such configuration and location to deflect the beam and focus it in accordance with potentials developed at the respective common output terminals 40 and 41 of the several phase comparator circuits. A teaching of the principles thus involved may be found, for example, in publications such as the textbook Fernsehen by Dr. F. Schröter, published in Berlin by Julius Springer in 1937, which contains a chapter on Electron Optic Geometry containing the principles involved in the construction of focussing and deflecting lens configurations.

Consider now that a color signal is reproduced on only the blue color lines of the kinescope. The subcarrier signal component will be picked up at only photocell 29 and inserted at the blue phase comparator circuit 32 along with the reference potential of phase $\phi_2$. Assuming for the moment that the subcarrier signal is occupying a zero relative phase angle indicating proper color hue reproduction for blue, the reference signal $\phi_2$ will be chosen at a 90° phase angle in order to provide between the phase comparator output terminals 40 and 41 a balanced or zero deflection potential output condition. Thus, if the color subcarrier phase indicates blue is the desired color and blue is the only color obtained at the sampling cells, there will be no deflection of the beam. The same operation holds true for the red and green subcarrier components in effecting deflection. The respective phase angles assumed to identify the color components may be changed with a corresponding change of the reference signal phase used for comparison. For purposes of ready comparison a table is provided for red, green, and blue hue color signals and two sets of corresponding reference signal phase conditions as follows:

| | B | G | R |
|---|---|---|---|
| Zero output at | 0 | 120° | 240° |
| Reference signal phase | 90° | 210° | 330° |
| Zero output at | 0 | 197° | 90° |
| Reference signal phase | 90° | 287° | 180° |

Should the color information not fall upon the proper ruled line, the balance condition will not exist (except when no signal potential is present) and a properly sensed deflecting potential will be developed between the terminals 40 and 41 by current or electron flow coming from the output terminals of one or a plurality of the phase comparator circuits in the direction indicated by the arrows above the output resistors 44 and 45.

Considering in detail this phase of operation, assume that the subcarrier falling on the blue lines has a relative phase of 120° indicating that the color hue green should be reproduced. The phase comparators 31 and 33 for the red and green signals will have no input signal potential and therefore will provide no output deflection potential. The blue phase comparator 32, however, will develop a potential corresponding to the phase difference between the signal developed and the reference signal at phase $\phi_2$. Accordingly, deflection potentials are developed in output resistors 44 and 45 to provide a potential differential between deflection electrodes 35 and 36 of enough magnitude to deflect the beam from the blue line to the green line. At this time, a balance or null condition is reached in both the blue and green phase comparators 32 and 33, thereby providing no deflection potential and maintaining the beam in registration on the green line. Like action is provided whether one or a plurality of signals is present since the output signal of each phase comparator circuit is used to deflect the beam. It is noted that in a standard television system, the deflection angle provided by the auxiliary electrodes 35 and 36 is small, being in the order of 1⁄525 of the total vertical deflection angle, and therefore reliable color registration is readily obtained.

The foregoing analysis was made with the assumption that the beam would be focussed on a single line. Assume now that the beam impinges on a spot which should represent only a blue subcarrier component but which is so large that it overlaps onto both the red and green lines. As hereinbefore mentioned, the color subcarrier amplitude denotes color saturation. Since only blue information is present the saturation is maximum and the subcarrier would have maximum amplitude. The phase comparator circuits are therefore so chosen that they are responsive to amplitude in the following manner. When a signal voltage is obtained balanced current components flow in both resistors 44 and 45 so that no differential potential is established between the deflecting electrodes 35 and 36, but the average potential as compared with surrounding electrodes is changed thereby affecting the focus of the beam.

Figure 2:
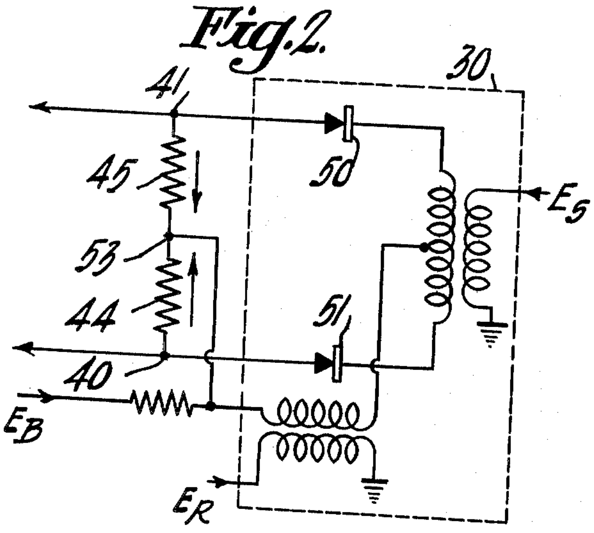
Figure 2 is a schematic circuit diagram of a phase comparator circuit which may be utilized in connection with the present invention.

Figure 2 illustrates schematically a phase comparator circuit which operates in this manner. As the signal potential $E_s$ is applied, both diodes 50 and 51 conduct upon opposite alternations of the signal potential to cause a balanced current flow in the resistors 44 and 45. The greater the signal amplitude, the greater the potential developed at the terminals 40 and 41 as compared with the midtap terminal 53 or the input terminal $E_b$ at which a biasing or auxiliary focussing potential may be added. It is therefore apparent that any subcarrier signal component $E_s$ present on the kinescope screen will cause the beam to be focussed to a smaller vertical area depending upon the amplitude of the subcarrier.

When the subcarrier amplitude is not at a maximum the color saturation is less and a white signal might be mixed with the color signal to obtain the present reproduction. Thus, the beam will be slightly defocused (in the vertical direction) supplying a white component made up of a portion of red, blue, and green light so that automatic saturation control is obtained by changing the beam focus. When the subcarrier amplitude is zero, the beam covers all the red, green, and blue lines so that a monochrome signal is reproduced.

Figure 3:
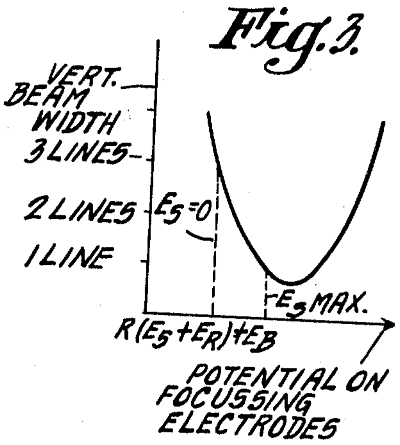
Figure 3 is a graphical representation of potentials derived from the signal which are useful in obtaining beam focussing.

Such a relationship of potential on the focusing electrodes as compared with vertical beam width is shown in Figure 3 where the potential is the summation of the rectified signal and reference potentials with the biasing potential as expressed by the term $R(E_s+E_r)+E_b$. The parabolic curve is shown to indicate that phase relationship between the signal and reference potentials may be either leading or lagging to effect the desired automatic focus operation.

Figure 4:
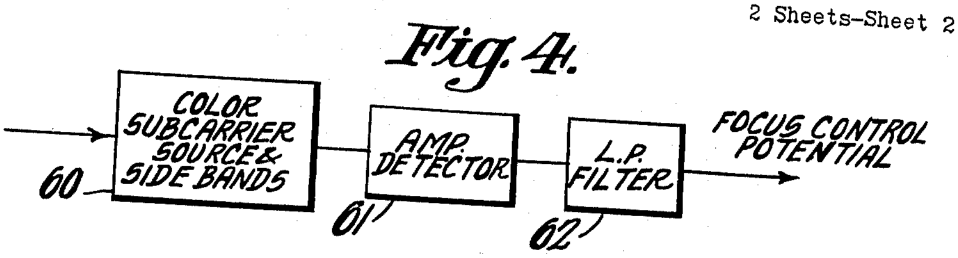
Figure 4 is a block diagram of a circuit embodiment for obtaining focus control potentials in accordance with the invention.

If a phase comparator is desired which is nonresponsive to subcarrier amplitude variations in the manner described, or should a separate deflecting and focusing system be desired, the circuit of Figure 4 may be used in accordance with the invention to obtain focus control potential. Thus, the block 60 indicates any suitable source of color subcarrier along with the side bands which may be found, for example, in the video circuits of a television receiver. The color subcarrier is then amplitude detected at the block circuit 61 and filtered at the block circuit 62 to provide the desired focus control potential at the output lead $E_b$. This potential, as that above described, is of an amplitude variable with the color saturation information, and may be connected at terminal 53 of Figure 1 to supplement or provide focus control, as desired.

Figure 5:
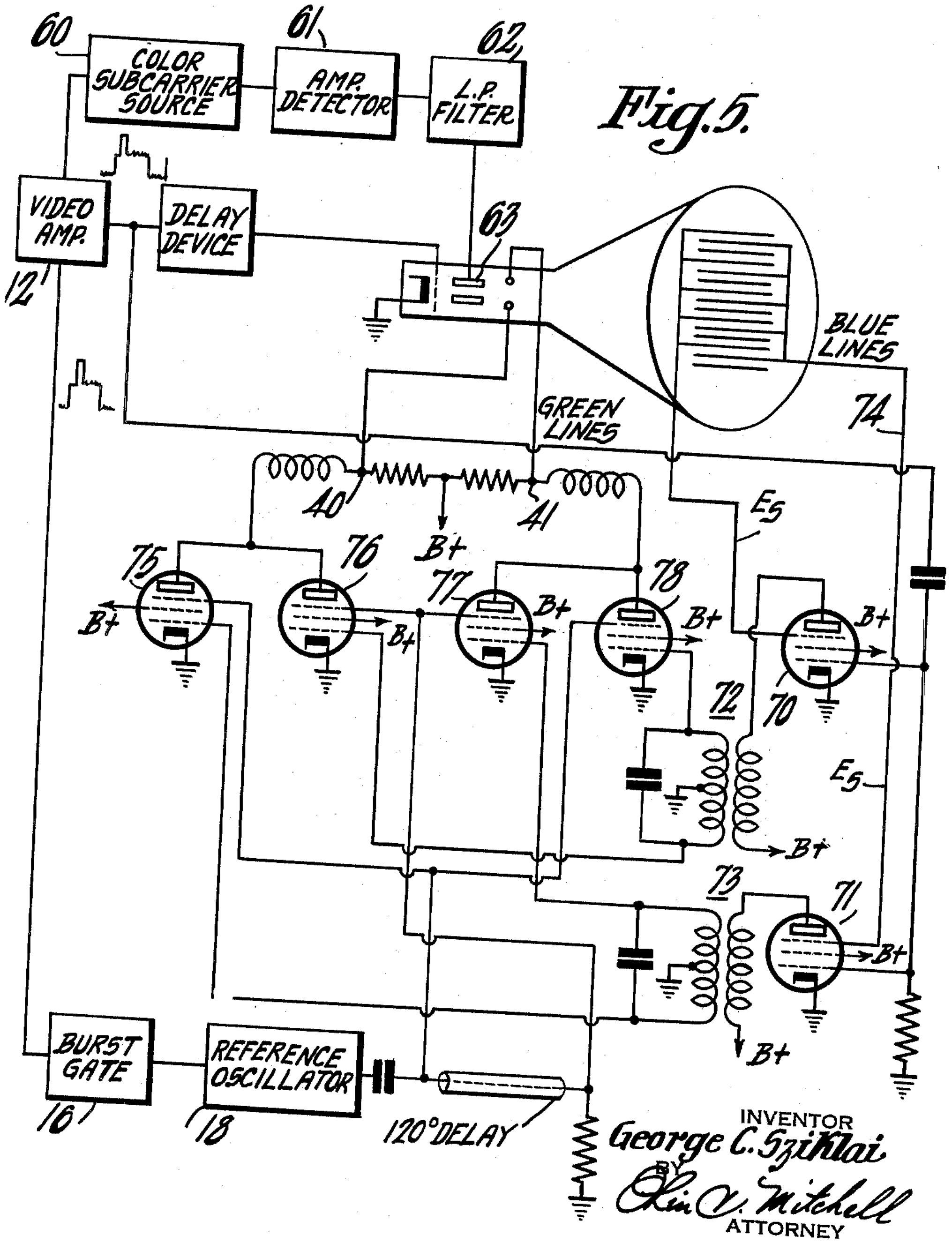
Figure 5 is a circuit diagram of a further embodiment of the invention.

Although the system described is more stable when a separate phase comparator is utilized for each primary color reproduced by the tube, satisfactory operation may be obtained with the simplified system of Figure 5. In this system, the sampling means are shown as conductive elements affixed to the green and blue lines on the kinescope screen. It is thereby recognized of course that color sampling may be accomplished by any other desired means and is not limited to the specific embodiments shown.

Different phase comparison circuits are shown here than those above described. In order to simplify explanation of this embodiment the automatic focus control aspect of the invention is not for the moment described in detail but is considered applied to a separate focus element 63. The system is described for use with a color subcarrier signal having the color hue information related to three subcarrier phase conditions 120° apart. It is to be recognized that the invention may be adapted by those skilled in the art to apply to phase order reversal systems and the like, but for purposes of simplicity and to enable a more ready grasp of the principles of the present invention, these features are not considered.

In the embodiment of Figure 5, amplifier tubes 70 and 71 are utilized for the purpose of obtaining a higher signal potential at the transformers 72 and 73 as well as to permit the insertion of a gain control component having an amplitude obtained as a function of the overall brightness of the signal from lead 74. The purpose of this feature is to permit high chroma colors independent of the brightness or beam intensity, and is more completely disclosed in the copending U. S. application of A. V. Bedford, Serial No. 130,204, filed November 20, 1949.

Phase comparison is made in the additional pentode tubes 75 to 78 which are amplitude responsive and in which the reference signal is applied to the suppressor or switching grid electrodes and the signal potential is applied to the control grid electrode. The output deflecting potentials of the system at terminals 40 and 41 will be dependent upon the relative phases of the signals in the same manner as the phase comparator circuits hereinbefore described, and will provide a focusing potential dependent upon the amplitude of the carrier which may be of itself sufficient or which may be supplemented by the potential on electrode 63.

The foregoing description of the invention has therefore provided an understanding of the principles and nature of construction thereof. Those features believed descriptive of the nature of the invention are defined with particularity in the appended claims.

I claim:

1. A television system for both reproducing color pictures and providing color registration with a line-screen single gun cathode ray tube comprising in combination means sampling a plurality of individual colors produced on the lines of said tube, means providing a color sub-carrier reference signal, a plurality of phase comparator circuits corresponding to the sampled colors, means controlling the cathode ray beam of said tube for producing colors on said screen intensity modulated by a video signal having a sub-carrier component, whose phase represents color hue, circuits connecting said sampling means and said reference signal respectively to said phase comparator circuits in such polarity and phase that output potentials corresponding to deflection signals are provided by said phase comparator circuits, and deflection means for said tube connected to said phase comparator circuits whereby both color reproduction and color registration is accurately provided.

2. A system as defined in claim 1 wherein said deflection means comprise electrodes so placed and constructed to afford beam focusing and the potentials derived at such phase comparator circuits automatically cause beam focusing upon a desired number of color lines when said beam is modulated by said signal sub-carrier component indicating the presence of color.

3. A system of automatic focus control for directing the beam of a colored line-screen cathode ray tube to one or a plurality of line widths comprising in combination, means sampling color signals of a separate primary color from the screen of said tube, a reference color subcarrier source, a phase comparator circuit, means modulating said beam with a color subcarrier signal whose phase represents color hue, focusing means in said tube connected to amplitude responsive terminals in said phase comparator, and a circuit coupling said subcarrier source and said sampling means to said phase comparator circuit in such phase to provide a focus control potential automatically determining beam width whereby for color signals a small spot is formed on said screen and for monochrome signals a large spot is formed on said screen encompassing a plurality of said colored lines thereby apparently resolving the lines into a monochrome picture.

4. A system as defined in claim 3 wherein deflecting means is provided for said tube connected to phase responsive terminals in said comparator circuit to afford automatic color registration upon desired colors, thereby affording in addition to color focus control both color detection and color registration.

5. A color television system comprising in combination, a plurality of adjacently positioned strip-like and horizontally oriented different selected component color light producing elements, means providing a single electron scanning beam, means causing said beam to successively traverse said elements, beam intensity control means for said beam, means controlling said beam intensity with a video signal including a color subcarrier component whose phase indicates color hue, deflecting means for registering said beam upon desired colors, phase comparator means having two input circuits and one output circuit, means sampling color signals of separate colors produced by said elements coupled to one of said input circuits, a color subcarrier reference signal connected to the other of said input circuits, and a circuit connecting said output circuit to said deflecting means whereby color signals are automatically registered for providing the hue indicated by the color subcarrier phase.

6. A system as defined in claim 5 having focusing means for said beam, and a circuit connecting said output circuit to said focusing means for automatically determining the beam width as a function of the color subcarrier amplitude component.

7. In a system for receiving color television signals including a color subcarrier wave component whose phase indicates hue and whose amplitude indicates saturation and for reproducing an image from said signals upon a ruled line, single beam color image-reproducing means, the combination including: means responsive to said color television signals for modulating the intensity of said beam, whereby the light produced by said image-reproducing means is modulated at subcarrier wave frequency and phase; means for sampling the modulated light from said image-reproducing means; a source of a color subcarrier reference signal; phase comparator means coupled to said light sampling means and to said reference signal source to develop a signal representative of a color other than that indicated by the phase of said color subcarrier wave; and beam deflection means operable in response to said developed color representative signal to direct said beam to one of said ruled lines producing the color indicated by the phase of said color subcarrier wave.

8. In a system for receiving color television signals including a color subcarrier wave component whose phase indicates hue and whose amplitude indicates saturation and for reproducing an image from said signals upon a color image-reproducing means, the combination including: means responsive to said color televison signals for modulating the intensity of said beam, whereby the light produced by said image-reproducing means is modulated at subcarrier wave frequency and phase; means for sampling the modulated light from said image-reproducing means; a source of a color subcarrier reference signal; phase comparator means coupled to said light sampling means and to said reference signal source to develop a signal representative of a color other than than that indicated by the phase of said color subcarrier wave; and beam deflection means operable in response to said developed color representative signal to direct said beam to the color indicated by the phase of said color subcarrier wave.

9. In a system for receiving color television signals including a color subcarrier wave component whose phase indicates hue and whose amplitude indicates saturation and for reproducing an image from said signals upon a color image-reproducing means, the combination including: means responsive to said color television signals for modulating the intensity of said beam, whereby the light produced by said image-reproducing means is modulated at subcarrier wave frequency and phase; means for sampling the modulated light from said image-reproducing means; a source of a color subcarrier reference signal; phase comparator means coupled to said light sampling means and to said reference signal source to develop a signal representative of a color other than that indicated by the phase of said color subcarrier wave; beam deflection means operable in response to said developed color representative signal to direct said beam to the color indicated by the phase of said color subcarrier wave; and means responsive to the amplitude of said color subcarrier wave for changing the spot size of said beam.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,530,431 | Huffman | Nov. 21, 1950 |
| 2,545,325 | Weimer | Mar. 13, 1951 |
| 2,568,543 | Goldsmith | Sept. 18, 1951 |
| 2,635,140 | Dome | Apr. 14, 1953 |
| 2,657,257 | Lesti | Oct. 27, 1953 |